(12) United States Patent
Silverstein et al.

(10) Patent No.: US 12,361,602 B2
(45) Date of Patent: Jul. 15, 2025

(54) AUGMENTED REALITY OVERLAY OF FEATURE AND VERSIONING IMPROVEMENT

(71) Applicant: International Business Machines Corporation, Armonk, NY (US)

(72) Inventors: Zachary A. Silverstein, Georgetown, TX (US); Logan Bailey, Atlanta, GA (US); Jacob Ryan Jepperson, St. Paul, MN (US); Melanie Dauber, Oceanside, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 18/476,457

(22) Filed: Sep. 28, 2023

(65) Prior Publication Data

US 2025/0111551 A1    Apr. 3, 2025

(51) Int. Cl.
*G06V 20/20* (2022.01)
*G06T 7/73* (2017.01)
*G06T 11/00* (2006.01)
*G06V 10/74* (2022.01)
*G06V 20/50* (2022.01)

(52) U.S. Cl.
CPC .............. *G06T 11/00* (2013.01); *G06T 7/73* (2017.01); *G06V 10/761* (2022.01); *G06V 20/20* (2022.01); *G06V 20/50* (2022.01); *G06T 2200/24* (2013.01)

(58) Field of Classification Search
None
See application file for complete search history.

(56) References Cited

U.S. PATENT DOCUMENTS

| | | | |
|---|---|---|---|
| 10,192,364 B2 | 1/2019 | Mott | |
| 10,275,945 B2 | 4/2019 | Lee | |
| 10,497,053 B2 | 12/2019 | Morrison | |
| 10,789,622 B2 * | 9/2020 | Ayush | G06F 18/2132 |
| 10,956,967 B2 | 3/2021 | Ayush | |
| 11,010,949 B2 | 5/2021 | Deluca | |
| 11,126,845 B1 * | 9/2021 | Chaturvedi | G06F 3/011 |

(Continued)

OTHER PUBLICATIONS

"IBM Diamondback Tape Library", IBM, Printed Jul. 28, 2023, 10 pages, <https://www.ibm.com/products/diamondback-tape-library>.

(Continued)

*Primary Examiner* — Parul H Gupta
(74) *Attorney, Agent, or Firm* — Aaron N. Pontikos

(57) ABSTRACT

In an approach for providing a user with a set of information on a feature of a comparable product and enabling the user to assess the feature by overlaying the user's product with a digital twin of the comparable product, a processor identifies a first product in a surrounding of the user by comparing an image of the first product to one or more images stored in a product corpus. A processor searches, based on the first product, the product corpus for one or more products within a family of the first product. A processor selects a second product from the product corpus based in part on a set of product comparison preferences. A processor overlays the first product with a digital twin of the second product. A processor simulates a feature associated with the second product that is different from a feature associated with the first product.

20 Claims, 3 Drawing Sheets

(56) References Cited

U.S. PATENT DOCUMENTS

| | | |
|---|---|---|
| 11,144,987 B2 | 10/2021 | Deluca |
| 11,270,367 B2 | 3/2022 | Abdollahian |
| 11,282,133 B2 | 3/2022 | Greenberger |
| 2011/0246064 A1* | 10/2011 | Nicholson ............. G06T 19/006 |
| | | 701/467 |
| 2015/0073907 A1* | 3/2015 | Purves ................. G06Q 20/384 |
| | | 705/14.58 |
| 2019/0156402 A1* | 5/2019 | Greenberger ...... G06Q 30/0643 |
| 2019/0340649 A1* | 11/2019 | Ayush .................. G06V 10/255 |
| 2021/0303617 A1 | 9/2021 | Choi |
| 2022/0084175 A1 | 3/2022 | Silverstein |
| 2022/0237243 A1 | 7/2022 | Deluca |
| 2025/0029170 A1* | 1/2025 | Chachek ............... H04W 4/024 |

OTHER PUBLICATIONS

"IBM TS4500 Tape Library", IBM, Printed Jul. 28, 2023, 10 pages, <https://www.ibm.com/products/ts4500>.

"Method and System for Providing User-Based Product Comparison with Augmented/Virtual Reality Glass," An IP.com Prior Art Database Technical Disclosure, IP.com No. IPCOM000258706D, IP.com Electronic Publication Date: Jun. 6, 2019, 5 pages.

Márquez et al., "Augmented-Reality-Enhanced Product Comparison in Physical Retailing.", Proceedings of the MuC'19: Mensch-und-Computer, Hamburg, Germany, Sep. 8-11, 2019 pp. 55-65. 2019.

* cited by examiner

AUGMENTED REALITY OVERLAY OF FEATURE AND VERSIONING IMPROVEMENT

BACKGROUND OF THE INVENTION

The present invention relates generally to the field of data processing, and more particularly to augmented reality overlay of features and versioning improvement.

Augmented reality (AR) is a live direct or indirect view of a physical, real-world environment the elements of which are augmented by computer-generated sensory input such as sound, video, graphics, or global positioning system (GPS) data. AR is related to a more general concept called computer-mediated reality, in which a view of reality is modified (possibly even diminished rather than augmented) by a computer. AR enhances one's current perception of reality, whereas in contrast, virtual reality replaces the real world with a simulated one. AR techniques are typically performed in real time and in semantic context with environmental elements, such as overlaying supplemental information like scores over a live video feed of a sporting event.

With the help of advanced AR technology (e.g., adding computer vision and object recognition), the information about the surrounding real world of the user becomes interactive and digitally manipulable. Information about the environment and its objects is overlaid on the real world. This information can be virtual or real, e.g., seeing other real sensed or measured information such as electromagnetic radio waves overlaid in exact alignment with where they are in space. AR brings the components of the digital world into a person's perceived real world.

Hardware components for AR include a processor, a display, sensors, and input devices. Modern mobile computing devices like smartphones and tablet computers contain these elements which often include a camera and microelectromechanical system (MEMS) sensors, such as an accelerometer, a GPS, and a solid-state compass, making them suitable AR platforms.

Various technologies are used in AR rendering including optical projection systems, monitors, hand-held devices, and display systems worn on the human body. A head-mounted display (HMD) is a display device paired to a harness or helmet. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can provide virtual reality users mobile and collaborative experiences.

AR displays can be rendered on devices resembling eyeglasses. Versions include eyewear that employ cameras to intercept the real-world view and re-display its augmented view through the eye pieces and devices in which the AR imagery is projected through or reflected off the surfaces of the eyewear lens pieces. A heads-up display, also known as a HUD, is a transparent display that presents data without requiring users to look away from their usual viewpoints. Near eye AR devices can be used as portable head-up displays as they can show data, information, and images while the user views the real world. Many definitions of AR only define it as overlaying the information. This is basically what a heads-up display does; however, practically speaking, AR is expected to include registration and tracking between the superimposed perceptions, sensations, information, data, and images and some portion of the real world.

SUMMARY

Aspects of an embodiment of the present invention disclose a method, computer program product, and computer system for providing a user with a set of information on a feature of a comparable product and enabling the user to assess the feature by overlaying the user's product with a digital twin of the comparable product. A processor identifies a first product in a surrounding of a user by comparing an image of the first product to one or more images stored in a product corpus. A processor searches, based on the first product, the product corpus for one or more products within a family of the first product. A processor selects a second product from the product corpus based in part on a set of product comparison preferences. A processor overlays the first product with a digital twin of the second product. A processor simulates one or more features associated with the second product that are different from one or more features associated with the first product.

In some aspects of an embodiment of the present invention, a processor identifies a state of the first product using an operating system level comparison.

In some aspects of an embodiment of the present invention, subsequent to identifying the state of the first product, a processor maps the first product to a digital twin of the first product. A processor captures a X axis, a Y axis, and a Z axis of the first product. A processor generates a plane of the first product.

In some aspects of an embodiment of the present invention, a processor digitally renders one or more differences in one or more non-physical performance aspects.

In some aspects of an embodiment of the present invention, a processor enables the user to alter a rendering of the first product with the digital twin of the second product. A processor displays the first product in parallel with the second product.

In some aspects of an embodiment of the present invention, a processor monitors one or more user interaction points with the first product. A processor simulates, based on the monitoring, an equivalent amount of interaction points on the digital twin of the second product, including simulation of a difference on a user interface of the digital twin of the second product.

In some aspects of an embodiment of the present invention, a processor receives a request for a product comparison preference from the user, wherein the product comparison preference includes at least one of a model of a desired product, a version of the desired product, one or more components of the desired product, and a cost preference of the user.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that a user may have an interest in a product without necessarily possessing knowledge of one or more physical and non-physical characteristics that distinguish the product from the product's predecessors. Embodiments of the present invention further recognize that, if a first product is superimposed over a second product, a discrepancy may arise when considering a varying version, model, or functionality of a given product. Therefore, embodiments of the present invention recognize the need for a system and method to provide a user with a set of information to understand one or more physical characteristics and one or more non-physical characteristics of a product. Such a system and method would allow the user to envision a value of a product. Additionally, as a new version or model of a product is released, such a system and method would confirm whether the new version or model of the product works in an existing infrastructure because, oftentimes, a new version or model of a product varies in size and additional work may be required. Lastly, such a system and method would improve a company's offerings and enable the company to manage the company's facilities and assets and to plan the company's upgrades more efficiently.

Embodiments of the present invention provide a system and method to provide a user with a set of information on one or more physical features and one or more non-physical features of a product comparable ("comparable product") to the user's product. Embodiments of the present invention provide a system and method to enable the user to assess a difference in the one or more physical features and the one or more non-physical features of the comparable product by utilizing augmented reality to overlay the user's product with a digital twin of the comparable product. Embodiments of the present invention provide a system and method implemented in an augmented reality system. Further, embodiments of the present invention provide a system and method implemented in a cloud-based date store or in a local-based date store.

Implementation of embodiments of the present invention may take a variety of forms, and exemplary implementation details are discussed subsequently with reference to the Figures.

Figure 1:
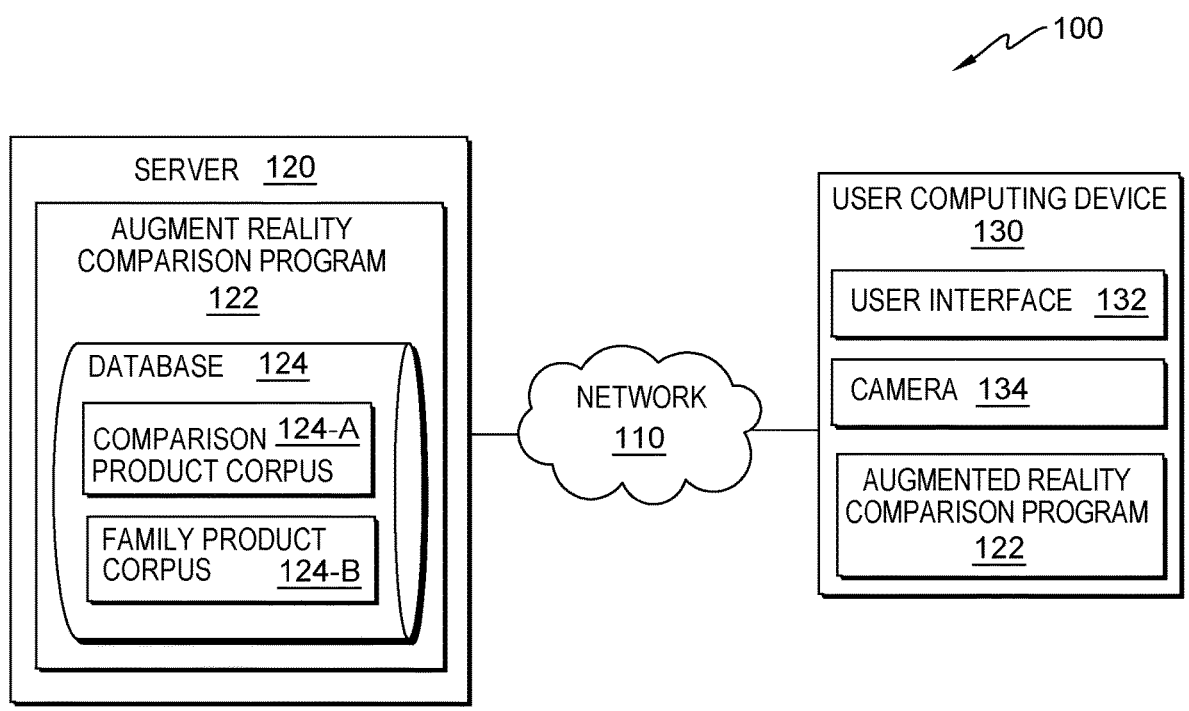
FIG. 1 is a functional block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120 and user computing device 130, and other computing devices (not shown) within distributed data processing environment 100.

Server 120 operates to run augmented reality comparison program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 3.

Augmented reality comparison program 122 operates to provide a user with a set of information on one or more physical features and one or more non-physical features of a product comparable ("comparable product") to the user's product. Additionally, augmented reality comparison program 122 operates to enable the user to assess a difference in the one or more physical features and the one or more non-physical features of the comparable product by utilizing augmented reality to overlay the user's product with a digital twin of the comparable product. In the depicted embodiment, augmented reality comparison program 122 is a standalone program. In another embodiment, augmented reality comparison program 122 may be integrated into another software product. In the depicted embodiment, augmented reality comparison program 122 resides on server 120. In another embodiment, augmented reality comparison program 122 may reside on another computing device (not shown), provided that augmented reality comparison program 122 has access to network 110. The operational steps of augmented reality comparison program 122 are depicted and described in further detail with respect to FIG. 2.

In an embodiment, the user of user computing device 130 registers with augmented reality comparison program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via augmented reality comparison program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by augmented reality comparison program 122. A database is an organized collection of data. Data includes, but is not limited to, information about user preferences (e.g., general user system settings such as alert notifications for user computing device 130); information about alert notification preferences; and any other data received, used, and/or generated by augmented reality comparison program 122. In the depicted embodiment, database 124 includes comparison corpus 124-A and product corpus 124-B.

Comparison product corpus 124-A operates to store one or more images of one or more comparable products collected from, but is not limited to being collected from, an augmented reality (AR) data stream and to store a set of data regarding a comparable product which includes, but is not limited to, a digital twin of the comparable product and an AR rendering of the comparable product. In an embodiment, augmented reality comparison program 122 gathers data from a user feedback system to store in comparison product corpus 124-A. In another embodiment, augmented reality comparison program 122 enables a user to upload (i.e., manually) data to store in comparison product corpus 124-A.

Family product corpus 124-B operates to store one or more products within a family of the first product (i.e., an equivalent state and/or a relevant state of the second product) and a set of data regarding the one or more products within the family of the first product.

Database 124 can be implemented with any type of device capable of storing data and configuration files that can be accessed and utilized by server 120, such as a hard disk drive, a database server, or a flash memory. In an embodiment, database 124 is accessed by augmented reality comparison program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that augmented reality comparison program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Augmented reality comparison program 122 enables the authorized and secure processing of personal data and/or confidential company data.

Augmented reality comparison program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Augmented reality comparison program 122 provides information regarding personal and/or confidential company data and the nature (e.g., type, scope, purpose, duration, etc.) of the processing. Augmented reality comparison program 122 provides the user with copies of stored personal and/or confidential company data. Augmented reality comparison program 122 allows the correction or completion of incorrect or incomplete personal and/or confidential company data. Augmented reality comparison program 122 allows for the immediate deletion of personal and/or confidential company data.

User computing device 130 operates to run user interface 132 through which a user can interact with augmented reality comparison program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with augmented reality comparison program 122 via network 110. In an embodiment, user computing device 130 is an augmented reality device. As used herein, the term augmented reality ("AR") refers to any technique for augmenting a real-world environment, such as a live video captured through a camera or recorded video, using computer-generated sensory input, such as sound, video, graphics, or GPS data. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between augmented reality comparison program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from augmented reality comparison program 122 to a user via network 110. User interface 132 can also display or present alerts including information (such as graphics, text, and/or sound) sent from augmented reality comparison program 122 to a user via network 110. In an embodiment, user interface 132 can send and receive data (i.e., to and from augmented reality comparison program 122 via network 110, respectively). Through user interface 132, a user can opt-in to augmented reality comparison program 122; input information about the user; create a user profile; set user preferences and alert notification preferences; set a product comparison preference (e.g., a model of a desired product, a version of a desired product, one or more components of a desired product, and a cost preference); activate augmented reality comparison program 122; select (i.e., manually) a first product in an environment of a user (i.e., in a surrounding of a user); receive a notification; input a response to the notification; be presented with an equivalent state and/or a relevant state of a second product; assess a difference in the one or more physical features and the one or more non-physical features of a comparable second product; interact with a user's product and with a digital twin of the comparable second product; receive a request for feedback; and input feedback.

A user preference is a setting that can be customized for a particular user. A set of default user preferences are assigned to each user of augmented reality comparison program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of augmented reality comparison program 122.

Figure 2:
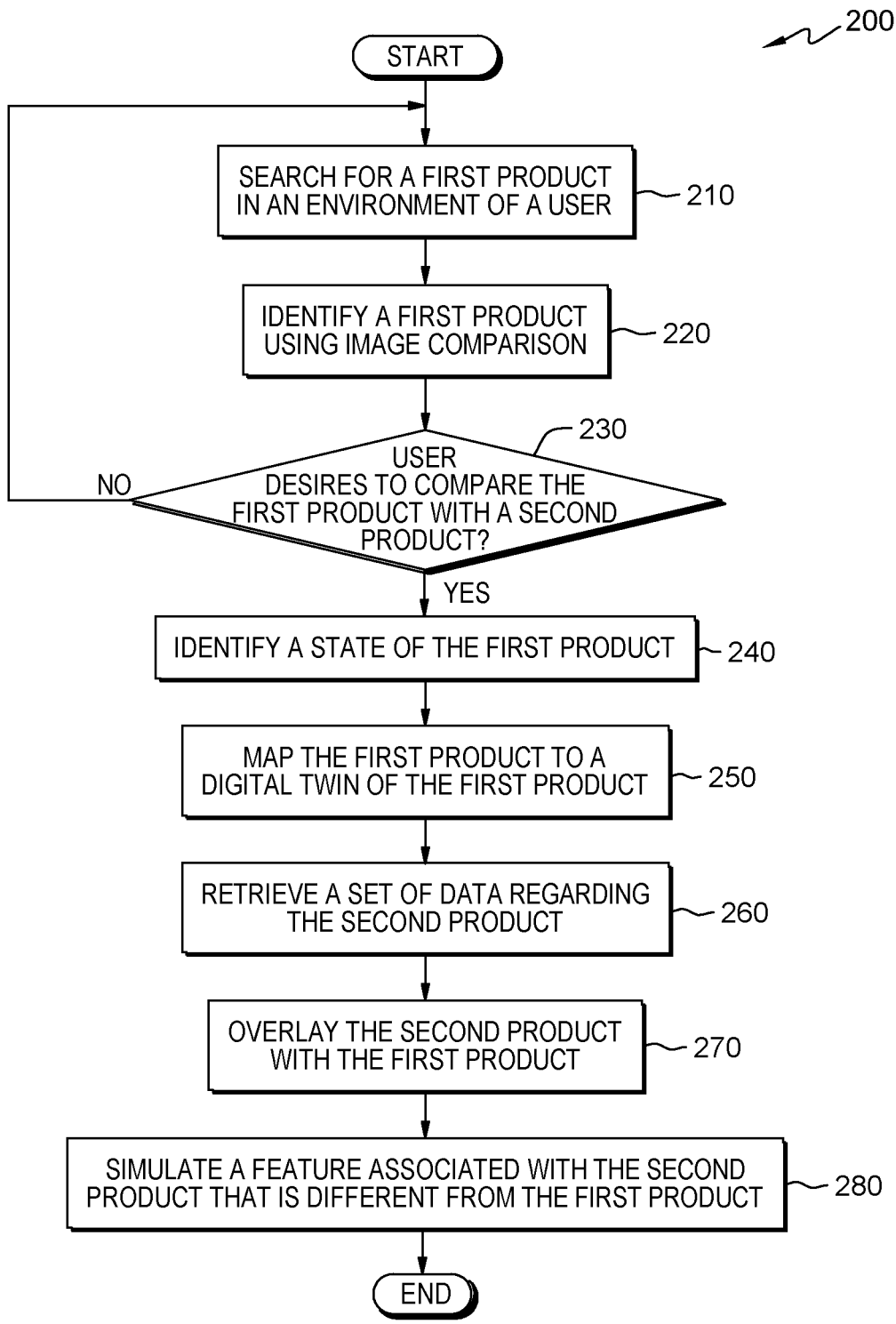
FIG. 2 is a flowchart illustrating the operational steps of an augmented reality comparison program, on a server within the distributed data processing environment of FIG. 1, in accordance with an embodiment of the present invention.

FIG. 2 is a flowchart, generally designated 200, illustrating the operational steps for augmented reality comparison program 122, on server 120 within distributed data processing environment 100 of FIG. 1, in accordance with an embodiment of the present invention. In an embodiment, augmented reality comparison program 122 operates to provide a user with a set of information on one or more physical features and one or more non-physical features of a product comparable ("comparable product") to the user's product. In an embodiment, augmented reality comparison program 122 operates to enable the user to assess a difference in the one or more physical features and the one or more non-physical features of the comparable product by utilizing augmented reality to overlay the user's product with a digital twin of the comparable product. It should be appreciated that the process depicted in FIG. 2 illustrates one possible iteration of the process flow, which may be repeated each time augmented reality comparison program 122 is activated by a user via a user interface (e.g., user interface 132) of a user computing device (e.g., user computing device 130).

In step 210, augmented reality comparison program 122 searches for a first product. In an embodiment, augmented reality comparison program 122 searches for a first product in an environment of a user (i.e., in a surrounding of a user). In an embodiment, augmented reality comparison program 122 searches for a first product via a camera (e.g., camera 134) of a user computing device (e.g., user computing device 130). In another embodiment, augmented reality comparison program 122 enables a user to select (i.e., manually) a first product in an environment of a user (i.e., in a surrounding of a user) via a user interface (e.g., user interface 132) of a user computing device (e.g., user computing device 130). In embodiments of the present invention, a product is a physical object, a system, or a service made available for consumer use to a user. For example, a user activates augmented reality comparison program 122 to compare a first product with a second product. A first product is a first version of a laptop a user owns. A second product is a second version laptop a user is considering purchasing (i.e., a comparable product).

In step 220, augmented reality comparison program 122 identifies the first product. In an embodiment, responsive to locating the first product in the environment of the user, augmented reality comparison program 122 identifies the first product. In another embodiment, responsive to the user selecting the first product in the environment of the user, augmented reality comparison program 122 identifies the first product. In an embodiment, augmented reality comparison program 122 identifies the first product by comparing an image of the first product to one or more images of one or more products previously stored in a comparison product corpus (e.g., comparison product corpus 124-A) of a database (e.g., database 124). One or more images of one or more products may be collected from, but is not limited to being collected from, an augmented reality (AR) data stream. In an embodiment, augmented reality comparison program 122 identifies the first product when the comparison of images reaches and/or exceeds a pre-defined threshold of similarity. A pre-defined threshold of similarity is reached and/or exceeded when a pre-defined degree of similarity between an image of the first product and an image from the one or more images of one or more products) is reached and/or exceeded.

In decision step 230, augmented reality comparison program 122 determines whether the user desires to compare the first product with a second product. In an embodiment, responsive to identifying the first product, augmented reality comparison program 122 determines whether the user desires to compare the first product with a second product. In an embodiment, augmented reality comparison program 122 determines whether the user desires to compare the first product with a second product from a user preference pre-defined by a user and stored as a user preference setting in a database (e.g., database 124). In another embodiment, augmented reality comparison program 122 determines whether the user desires to compare the first product with a second product through an interaction with the user. In an embodiment, augmented reality comparison program 122 outputs a notification to the user. In an embodiment, augmented reality comparison program 122 outputs a notification to the user requesting the user confirm a desire to compare the first product with a second product. In an embodiment, augmented reality comparison program 122 outputs a notification to the user via the user interface (e.g., user interface 132) of the user computing device (e.g., user computing device 130). In an embodiment, augmented reality comparison program 122 enables the user to input a response. A response may include, but is not limited to, an acceptance and a rejection of a desire to compare the first product with a second product. In an embodiment, augmented reality comparison program 122 enables a user to input a response via a user interface (e.g., user interface 132) of a user computing device (e.g., user computing device 130). In an embodiment, responsive to the user expressing a desire to compare the first product with a second product (decision step 230, YES branch), augmented reality comparison program 122 proceeds to step 240, identifying a state of the first product. In an embodiment, responsive to the user rejecting a desire to compare the first product with a second product (decision step 230, NO branch), augmented reality comparison program 122 returns to step 210, searching for a first product.

In step 240, augmented reality comparison program 122 identifies a state of the first product. A state is, but is not limited to, a version of a product and a model of a product. In an embodiment, responsive to the user expressing a desire to compare the first product with a second product, augmented reality comparison program 122 identifies a state of the first product. In an embodiment, augmented reality comparison program 122 identifies a state of the first product using an operating system level comparison. An operating system is a system software that manages hardware and software resources and provides common services for programs. An operating system level comparison is a comparison of an operating system of the first product and an operating system of the second product. In another embodiment, augmented reality comparison program 122 identifies a state of the first product using a visual comparison. In an embodiment, augmented reality comparison program 122 searches for one or more products within a family of the first product (i.e., an equivalent state and/or a relevant state of the second product). In an embodiment, augmented reality comparison program 122 searches for one or more products within a family of the first product in a family product corpus (e.g., family product corpus 124-B) of a database (e.g., database 124). In an embodiment, augmented reality comparison program 122 searches for one or more products within a family of the first product based on one or more aspects of the first product. One or more products within a family of the first product includes, but is not limited to, a newer version of the first product, an upgraded version of the first product, a different model of the first product, and a replacement product of the first product. In an embodiment, augmented reality comparison program 122 identifies an equivalent state and/or a relevant state of the second product. In an embodiment, augmented reality comparison program 122 identifies an equivalent state and/or a relevant state of the second product stored in a family product corpus (e.g., family product corpus 124-B). In an embodiment, augmented reality comparison program 122 presents the equivalent state and/or relevant state of the second product to the user. In an embodiment, augmented reality comparison program 122 presents the equivalent state and/or relevant state of the second product to the user via a user interface (e.g., user interface 132) of a user computing device (e.g., user computing device 130). In an embodiment, augmented reality comparison program 122 presents the equivalent state and/or relevant state of the second product on the second product adjacent to the first product (i.e., to enable the user to observe the second product and to form one or more comparison points). In some embodiments, augmented reality comparison program 122 shuffles or iterates through one or more equivalent states and/or relevant states of the second product. In an embodiment, augmented reality comparison program 122 selects a second product. In an embodiment, augmented reality comparison program 122 selects a second product from a family product corpus (e.g., family product corpus 124-B). In an embodiment, augmented reality comparison program 122 selects a second product based in part on a set of product comparison preferences. A set of product comparison preferences include, but are not limited to, a model of a desired product, a version of a desired product, one or more components of a desired product, and a cost preference. In another embodiment, augmented reality comparison program 122 enables the user to select a second product from a family product corpus (e.g., family product corpus 124-B) using a user interface (e.g., user interface 132) of a user computing device (e.g., user computing device 130).

In step 250, augmented reality comparison program 122 maps the first product. In an embodiment, responsive to identifying a state of the first product, augmented reality comparison program 122 maps the first product. In an embodiment, augmented reality comparison program 122 captures a X axis, a Y axis, and a Z axis of the first product. In an embodiment, augmented reality comparison program 122 generates a plane of the first product. In an embodiment, augmented reality comparison program 122 maps the first product to a digital twin of the first product. The digital twin of the first product may be used as a centering axis (i.e., X, Y, Z axis) for a second product (i.e., a comparison product).

In step 260, augmented reality comparison program 122 retrieves a set of data regarding the second product. In an embodiment, responsive to mapping the first product, augmented reality comparison program 122 retrieves a set of data regarding the second product. In an embodiment, augmented reality comparison program 122 retrieves a set of data regarding the second product from a family product corpus (e.g., family product corpus 124-B) of a database (e.g., database 124). The set of data regarding the second product may include, but is not limited to, a digital twin of the second product and an AR rendering of the second product.

In step 270, augmented reality comparison program 122 overlays the first product with a digital twin of the second product. In an embodiment, responsive to retrieving the set of data regarding the second product, augmented reality comparison program 122 overlays the first product with a digital twin of the second product. In an embodiment, augmented reality comparison program 122 overlays the first product with a digital twin of the second product using the X, Y, Z axis captured of the first product as a guide. In an embodiment, augmented reality comparison program 122 digitally renders one or more differences in one or more physical aspects of the second product. In an embodiment, augmented reality comparison program 122 digitally renders one or more differences in one or more non-physical performance aspects of the second product. In an embodiment, augmented reality comparison program 122 digitally renders one or more differences of the second product on a user interface (e.g., user interface 132) of a user computing device (e.g., user computing device 130). In an embodiment, augmented reality comparison program 122 enables the user to alter a digital rendering of the first product with the digital twin of the second product. In an embodiment, augmented reality comparison program 122 enables the user to view the first product in parallel with the second product. In an embodiment, responsive to the user opting to alter the rendering of the first product with the digital twin of the second product, augmented reality comparison program 122 displays the first product in parallel with the second product. In an embodiment, augmented reality comparison program 122 displays the first product in parallel with the second product on a user interface (e.g., user interface 132) of a user computing device (e.g., user computing device 130).

In step 280, augmented reality comparison program 122 simulates a feature associated with the second product that is different from the first product. In an embodiment, responsive to overlaying the second product with the first product, augmented reality comparison program 122 simulates a feature associated with the second product that is different from the first product. In an embodiment, augmented reality comparison program 122 simulates a feature associated with the second product that is different from the first product for a user to observe on a user interface (e.g., user interface 132) of a user computing device (e.g., user computing device 130). The simulation comprises a digital rendering of one or more differences in physical performance aspects (e.g., a set of dimensions of a product, a weight of a product, a size of an interface on a product, and a placement of a camera on a product) and a digital rendering of one or more differences in non-physical performance aspects (e.g., a processing power, a storage capacity, a download speed, and a software). In an embodiment, augmented reality comparison program 122 monitors one or more user interaction points with the first product. In an embodiment, augmented reality comparison program 122 simulates, based on the monitoring, an equivalent amount of interaction points on the digital twin of the second product, including, but not limited to, a simulation of a difference on a user interface of the digital twin of the second product.

Figure 3:
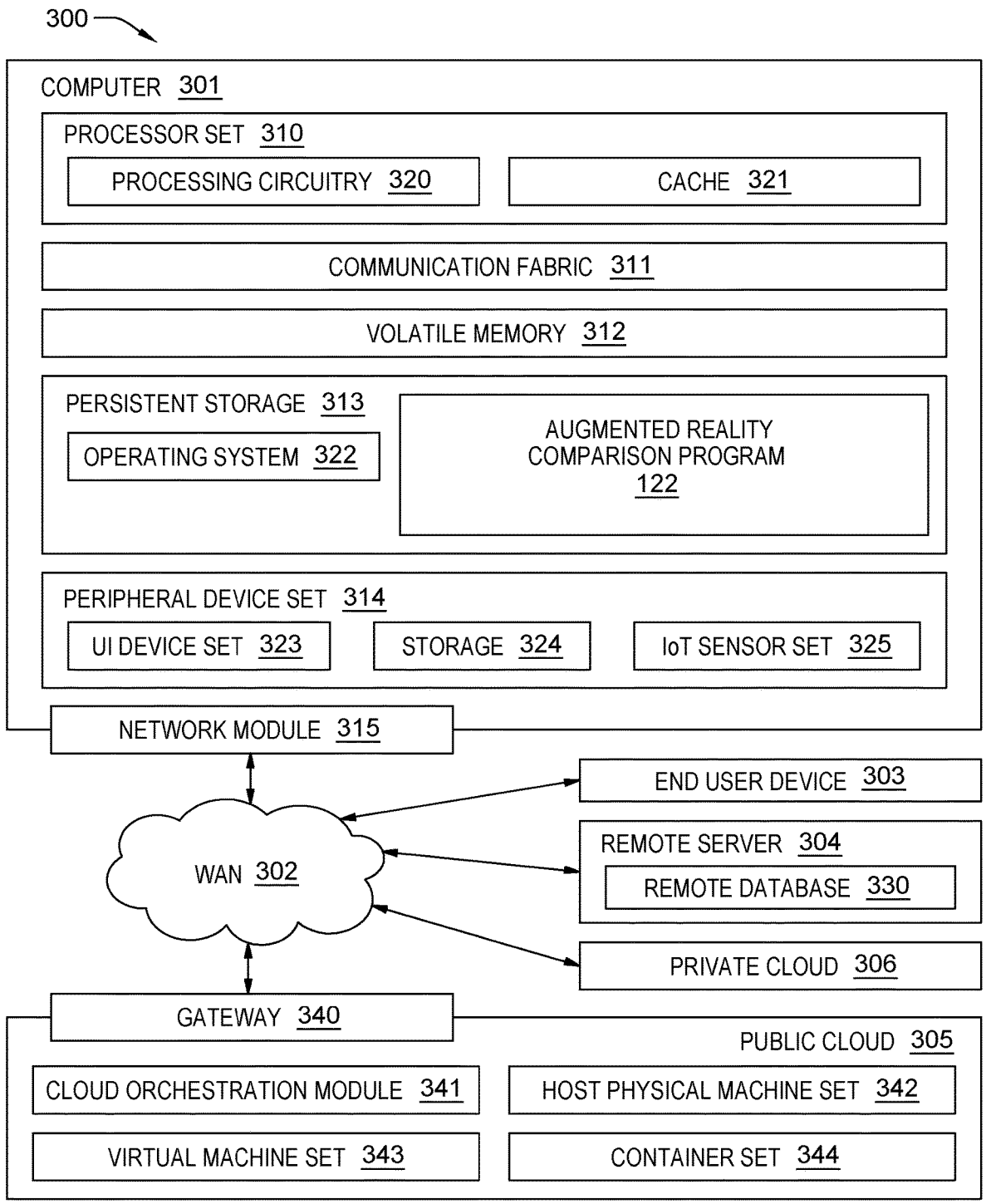
FIG. 3 depicts a block diagram of components of a computing environment representing the distributed data processing environment of FIG. 1, in accordance with an embodiment of the present invention.

FIG. 3 depicts a block diagram of components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as augmented reality comparison program 122. In addition to augmented reality comparison program 122, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and augmented reality comparison program 122, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in augmented reality comparison program 122 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in augmented reality comparison program 122 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method and system comprising:
   identifying, by one or more processors, a first product in a surrounding of a user by comparing an image of the first product to one or more images stored in a product corpus;
   searching, by the one or more processors, based on the first product, the product corpus for one or more products within a family of the first product;
   selecting, by the one or more processors, a second product from the product corpus based in part on a set of product comparison preferences;
   overlaying, by the one or more processors, the first product with a digital twin of the second product; and
   simulating, by the one or more processors, one or more features associated with the second product that are different from one or more features associated with the first product.

2. The computer-implemented method of claim 1, wherein identifying the first product further comprises:
   identifying, by the one or more processors, a state of the first product using an operating system level comparison.

3. The computer-implemented method of claim 2, further comprising:
   subsequent to identifying the state of the first product, mapping, by the one or more processors, the first product to a digital twin of the first product;
   capturing, by the one or more processors, a X axis, a Y axis, and a Z axis of the first product; and
   generating, by the one or more processors, a plane of the first product.

4. The computer-implemented method of claim 1, wherein overlaying the first product with the digital twin of the second product further comprises:
   digitally rendering, by the one or more processors, one or more differences in one or more non-physical performance aspects.

5. The computer-implemented method of claim 1, wherein overlaying the first product with the digital twin of the second product further comprises:
   enabling, by the one or more processors, the user to alter a rendering of the first product with the digital twin of the second product; and
   displaying, by the one or more processors, the first product in parallel with the second product.

6. The computer-implemented method of claim 1, wherein simulating the one or more features associated with the second product that are different from the one or more features associated with the first product further comprises:
- monitoring, by the one or more processors, one or more user interaction points with the first product; and
- simulating, by the one or more processors, based on the monitoring, an equivalent amount of interaction points on the digital twin of the second product, including simulation of a difference on a user interface of the digital twin of the second product.

7. The computer-implemented method of claim 1, further comprising:
- receiving, by the one or more processors, a request for a product comparison preference from the user, wherein the product comparison preference includes at least one of a model of a desired product, a version of the desired product, one or more components of the desired product, and a cost preference of the user.

8. A computer program product comprising:
- one or more computer readable storage media and program instructions stored on the one or more computer readable storage media, the program instructions comprising:
- program instructions to identify a first product in a surrounding of a user by comparing an image of the first product to one or more images stored in a product corpus;
- program instructions to search based on the first product, the product corpus for one or more products within a family of the first product;
- program instructions to select a second product from the product corpus based in part on a set of product comparison preferences;
- program instructions to overlay the first product with a digital twin of the second product; and
- program instructions to simulate one or more features associated with the second product that are different from one or more features associated with the first product.

9. The computer program product of claim 8, wherein identifying the first product further comprises:
- program instructions to identify a state of the first product using an operating system level comparison.

10. The computer program product of claim 9, further comprising:
- subsequent to identifying the state of the first product, program instructions to map the first product to a digital twin of the first product;
- program instructions to capture a X axis, a Y axis, and a Z axis of the first product; and
- program instructions to generate a plane of the first product.

11. The computer program product of claim 8, wherein overlaying the first product with the digital twin of the second product further comprises:
- program instructions to digitally render one or more differences in one or more non-physical performance aspects.

12. The computer program product of claim 8, wherein overlaying the first product with the digital twin of the second product further comprises:
- program instructions to enable the user to alter a rendering of the first product with the digital twin of the second product; and
- program instructions to display the first product in parallel with the second product.

13. The computer program product of claim 8, wherein simulating the one or more features associated with the second product that are different from the one or more features associated with the first product further comprises:
- program instructions to monitor one or more user interaction points with the first product; and
- program instructions to simulate based on the monitoring, an equivalent amount of interaction points on the digital twin of the second product, including simulation of a difference on a user interface of the digital twin of the second product.

14. The computer program product of claim 8, further comprising:
- receiving, by the one or more processors, a request for a product comparison preference from the user, wherein the product comparison preference includes at least one of a model of a desired product, a version of the desired product, one or more components of the desired product, and a cost preference of the user.

15. A computer system comprising:
- one or more computer processors;
- one or more computer readable storage media;
- program instructions collectively stored on the one or more computer readable storage media for execution by at least one of the one or more computer processors, the stored program instructions comprising:
- program instructions to identify a first product in a surrounding of a user by comparing an image of the first product to one or more images stored in a product corpus;
- program instructions to search based on the first product, the product corpus for one or more products within a family of the first product;
- program instructions to select a second product from the product corpus based in part on a set of product comparison preferences;
- program instructions to overlay the first product with a digital twin of the second product; and
- program instructions to simulate one or more features associated with the second product that are different from one or more features associated with the first product.

16. The computer system of claim 15, wherein identifying the first product further comprises:
- program instructions to identify a state of the first product using an operating system level comparison;
- program instructions to map the first product to a digital twin of the first product;
- program instructions to capture a X axis, a Y axis, and a Z axis of the first product; and
- program instructions to generate a plane of the first product.

17. The computer system of claim 15, wherein overlaying the first product with the digital twin of the second product further comprises:
- program instructions to digitally render one or more differences in one or more non-physical performance aspects.

18. The computer system of claim 15, wherein overlaying the first product with the digital twin of the second product further comprises:
- program instructions to enable the user to alter a rendering of the first product with the digital twin of the second product; and
- program instructions to display the first product in parallel with the second product.

19. The computer system of claim 15, wherein simulating the one or more features associated with the second product that are different from the one or more features associated with the first product further comprises:

program instructions to monitor one or more user interaction points with the first product; and program instructions to simulate based on the monitoring, an equivalent amount of interaction points on the digital twin of the second product, including simulation of a difference on a user interface of the digital twin of the second product.

20. The computer system of claim 15, further comprising:

receiving, by the one or more processors, a request for a product comparison preference from the user, wherein the product comparison preference includes at least one of a model of a desired product, a version of the desired product, one or more components of the desired product, and a cost preference of the user.

\* \* \* \* \*